US009608878B2

(12) United States Patent
Hoferlin et al.

(10) Patent No.: US 9,608,878 B2
(45) Date of Patent: Mar. 28, 2017

(54) METHOD FOR LOCATING A FIELD DEVICE IN AN AUTOMATED PLANT

(71) Applicant: Endress + Hauser Process Solutions AG, Reinach (CH)

(72) Inventors: Wolfgang Hoferlin, Efringen-Kirchen (DE); Eric Birgel, Schopfheim (DE); Ralf Schmidt, Kembs (FR); Mike Sutter, Maulburg (DE)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 216 days.

(21) Appl. No.: 14/033,730

(22) Filed: Sep. 23, 2013

(65) Prior Publication Data

US 2014/0089501 A1 Mar. 27, 2014

(30) Foreign Application Priority Data

Sep. 24, 2012 (DE) ........................ 10 2012 108 990

(51) Int. Cl.
| | |
|---|---|
| G06F 15/16 | (2006.01) |
| H04L 12/26 | (2006.01) |
| H04W 64/00 | (2009.01) |
| H04L 29/08 | (2006.01) |
| H04W 4/02 | (2009.01) |
| H04W 4/04 | (2009.01) |
| G06F 17/30 | (2006.01) |
| H04W 4/00 | (2009.01) |

(52) U.S. Cl.
CPC ............. *H04L 43/04* (2013.01); *H04L 67/18* (2013.01); *H04W 4/02* (2013.01); *H04W 4/04* (2013.01); *H04W 4/043* (2013.01); *H04W 64/00* (2013.01); *G06F 17/30241* (2013.01); *H04L 67/12* (2013.01); *H04W 4/008* (2013.01); *H04W 4/023* (2013.01)

(58) Field of Classification Search
CPC ...................................................... H04W 64/00
USPC ......................................................... 709/224
See application file for complete search history.

(56) References Cited

U.S. PATENT DOCUMENTS

| 6,674,363 | B2* | 1/2004 | Bartelheim | .......... | G05B 19/042 |
| | | | | | 340/524 |
| 7,010,294 | B1* | 3/2006 | Pyotsia | ................ | G05B 19/042 |
| | | | | | 340/3.1 |
| 8,040,818 | B2 | 10/2011 | Maneval | | |
| 8,160,574 | B1 | 4/2012 | Nelson | | |
| 8,766,794 | B2* | 7/2014 | Ferguson | ............. | G05B 19/042 |
| | | | | | 340/539.11 |
| 2002/0171558 | A1* | 11/2002 | Bartelheim | .......... | G05B 19/042 |
| | | | | | 340/8.1 |

(Continued)

FOREIGN PATENT DOCUMENTS

| DE | 102007061239 A1 | 7/2008 |
| DE | 102007034634 A1 | 1/2009 |

OTHER PUBLICATIONS

German Search Report, German Patent Office, Munich, Aug. 22, 2013.

*Primary Examiner* — Hamza Algibhah
(74) *Attorney, Agent, or Firm* — Bacon & Thomas, PLLC

(57) ABSTRACT

A method for locating at least one field device in an automated plant, wherein the field device is connected via a network composed of a plurality of distributed field devices, and wherein a mobile terminal is applied for locating the field device.

3 Claims, 1 Drawing Sheet

(56) References Cited

U.S. PATENT DOCUMENTS

| | | | | |
|---|---|---|---|---|
| 2005/0021597 | A1* | 1/2005 | Derasmo | G06F 17/30575 709/201 |
| 2008/0263174 | A1 | 10/2008 | Manson | |
| 2010/0290359 | A1* | 11/2010 | Dewey | G05B 19/4185 370/252 |
| 2012/0040698 | A1* | 2/2012 | Ferguson | G05B 19/042 455/457 |
| 2013/0141567 | A1* | 6/2013 | Walker | H04M 1/7253 348/135 |
| 2013/0316753 | A1* | 11/2013 | Van Dijk | A01K 11/006 455/517 |
| 2014/0169320 | A1* | 6/2014 | Yi | H04W 24/10 370/329 |
| 2014/0357307 | A1* | 12/2014 | Zwaal | H04W 64/003 455/457 |
| 2015/0134497 | A1* | 5/2015 | Carney | G06F 17/30047 705/28 |

\* cited by examiner

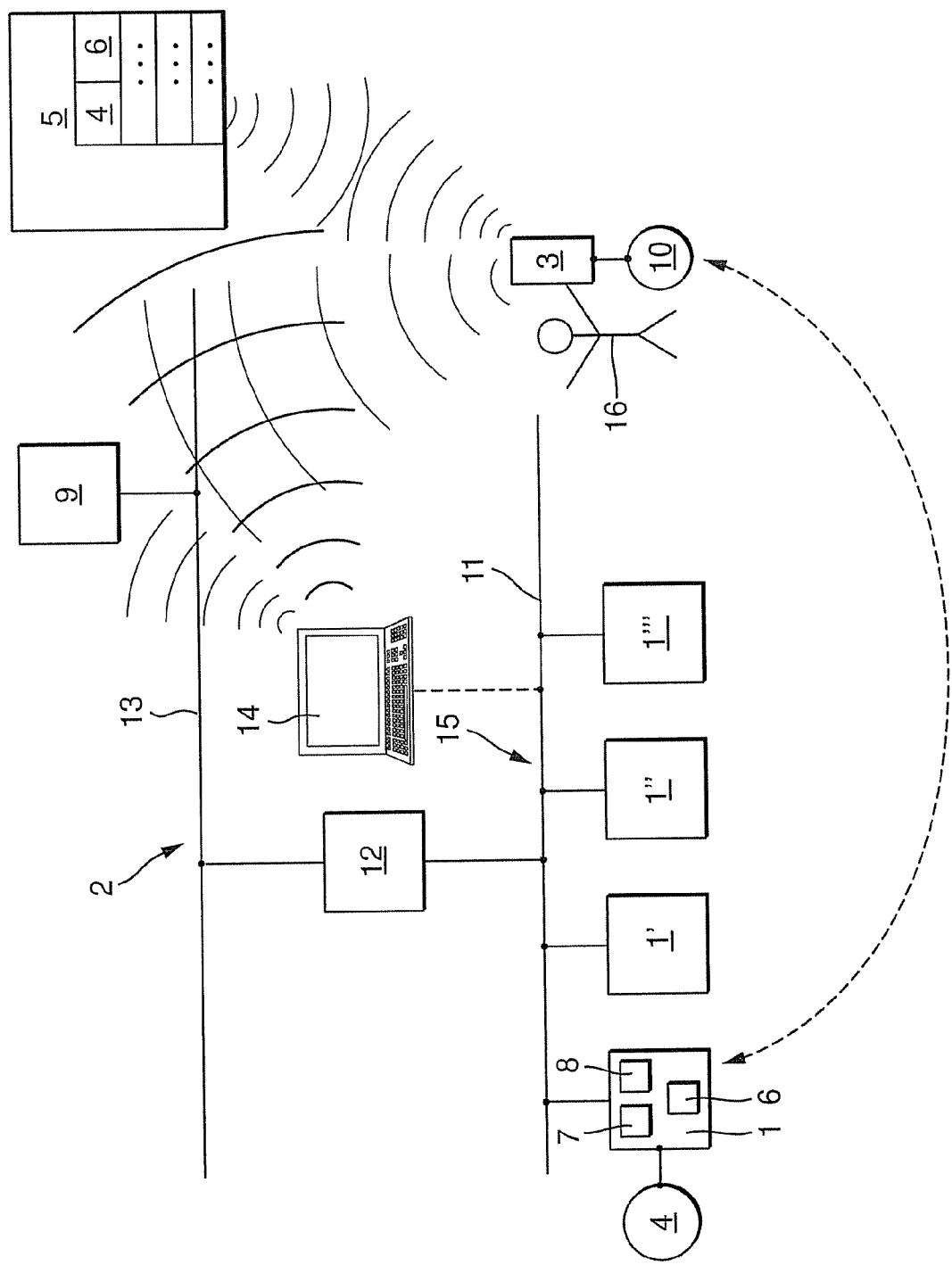

METHOD FOR LOCATING A FIELD DEVICE IN AN AUTOMATED PLANT

TECHNICAL FIELD

The invention relates to a method for locating a field device in an automated plant.

BACKGROUND DISCUSSION

In process automation technology, field devices are often applied, which serve for registering and/or influencing process variables. Serving for registering process variables are sensors, such as, for example, fill level measuring devices, flow measuring devices, pressure- and temperature measuring devices, pH-redox potential measuring devices, conductivity measuring devices, etc., which register the respective process variables, fill level, flow, pressure, temperature, pH-value, and conductivity. Serving for influencing process variables are actuators, such as, for example, valves or pumps, via which the flow of a liquid in a section of pipeline, respectively the fill level in a container, can be changed. Referred to as field devices are, in principle, all devices, which are applied near to the process and which deliver or process information relevant to the process. Besides the above mentioned sensors and actuators, referred to as field devices are generally also units, which are connected directly to a fieldbus and which serve for communication with the superordinated units, such as e.g. remote I/Os, gateways, linking devices and wireless adapters. A large number of such field devices are produced and sold by the Endress+Hauser group of companies.

Such field devices are, in the case of larger plants, especially in the case of production plants, most often, arranged distributed over a very wide area. In the case of a disturbance or also for routine maintenance, these field devices must be identified and located in as short a time as possible, in order to be able to remove the disturbance on-site, respectively to perform the maintenance. In such case, the exact locating of the field device represents, most often, a problem that must be solved efficiently.

Known from DE 10163564A1 is the equipping of such a field device with a GPS module, in order to provide locational information to enable locating the field device with sufficient accuracy.

The equipping of a field device with a GPS module can, as a rule, only be performed by the field device manufacturer. Typically, the GPS module is integrated during production of the field device at the plant of the field device manufacturer. Then, the field device with the integrated GPS module is placed in operation at the plant of the field device user.

The equipping of a field device with a GPS module has the disadvantage that it is not only technically complicated, but also means additional costs.

A further disadvantage is that field devices already integrated into an automated plant and being used are only extremely difficultly retrofittable. Even in this case, the subsequent integration of a GPS module would be performed by the field device manufacturer. In this connection, the field device would be removed from the location of installation in the plant. This means, however, for the field device user, that, for the time needed for the retrofitting, a replacement field device instead of the actual field device would be integrated in the plant. This, in turn, means increased effort.

SUMMARY OF THE INVENTION

An object of the invention, therefore, is to provide a method that enables locating a field device in an especially user friendly manner.

The object is achieved according to the invention by a first variant of the method for locating at least one field device in an automated plant, wherein the field device is connected to a network composed of a plurality of distributed field devices, wherein a mobile terminal is applied for locating the field device and wherein locational information corresponding to the location of installation of the field device is stored in a web server, and wherein there is stored in the web server besides the locational information also an identification feature associated with the field device, wherein the associable identification feature is linked with the locational information stored in the web server and the method for locating the field device comprises steps as follows:
  transmitting the identification feature of the field device to be located to the web server with the assistance of the mobile terminal,
  ascertaining the linked locational information stored in the web server based on the identification feature,
  returning to the mobile terminal the ascertained locational information or a geographical map, in which the locational information is entered, and
  locating the field device by means of the mobile terminal based on the ascertained locational information.

The object is achieved according to the invention also by a second variant of the method for locating at least one field device in an automated plant, wherein the field device is connected to at least one superordinated unit via a network composed of a plurality of distributed field devices, wherein a mobile terminal is applied for locating the field device and wherein locational information corresponding to the location of installation of the field device is stored in the field device and the method for locating the field device comprises steps as follows:
  accessing the field device via the network with the assistance of the superordinated unit,
  reading-out the locational information stored in the field device,
  transmitting the stored locational information to the superordinated unit,
  transmitting the locational information from the superordinated unit to the mobile terminal, and
  locating the field device by means of the mobile terminal based on the ascertained locational information.

The object is achieved according to the invention, moreover, also by a third variant of the method for locating at least one field device in an automated plant, wherein the field device is connected to at least one superordinated unit via a network composed of a plurality of distributed field devices, wherein for the distributed field devices locational information corresponding to the locations of installation of the respective field devices is stored in a web server and/or the superordinated unit, wherein a mobile terminal is applied for locating at least one field device and the method for locating the field devices comprises steps as follows:
  transmitting the current locational information of the mobile terminal to the web server and/or the superordinated unit with the assistance of the mobile terminal,
  ascertaining the locational information stored in the web server and/or the superordinated unit and located within a predetermined separation/vicinity of the current locational information of the mobile terminal, returning to the mobile terminal the ascertained locational information or a geographical map, in which the locational information are entered, and locating the field devices by means of the mobile terminal based on the ascertained, returned locational information.

According to the invention, the method is achieved by associating with the field device, instead of an integrated GPS module, the locational information corresponding to the location of installation, for example, by placing such information in a web server and/or in a superordinated unit and/or in the field device itself. Based on this locational information, the corresponding field device is then locatable in the case of need.

An advantageous embodiment of the method of the invention provides for all three variants that the locational information includes at least one longitude and at least one latitude.

Another advantageous embodiment of the method of the invention for all three variants provides that the locational information corresponding to the location of installation of the field device is ascertained at start-up of the field device in the automated plant and/or upon a service visit to the field device.

An advantageous embodiment of the method of the invention for the first variant provides that the identification feature associated with the field device is a serial number and/or a tag.

An advantageous embodiment of the method of the invention for the second variant provides that the recorded locational information is stored in the field device in the form of one or more parameters.

BRIEF DESCRIPTION OF THE DRAWING

The invention will now be explained in greater detail based on the appended drawing, the figures of which show as follows:

FIG. 1 is a schematic representation of the method of the invention.

DETAILED DISCUSSION IN CONJUNCTION WITH THE DRAWING

FIG. 1 shows a schematic representation of the method of the invention. Provided for this is a network 2 of automation technology having a plurality of field devices 1 interconnected via a fieldbus 11. The field devices 1 are connected via a data bus 13 to at least one computer unit (work station) 9. This computer unit 9 can serve as superordinated unit (control system, respectively control unit) for process visualizing, process monitoring and for engineering, however, also for servicing and monitoring the field devices 1. Data bus 13 works according to one of the established process automation standards (Profibus, Foundation Fieldbus, HSE—High Speed Ethernet, etc.). Gateway 12, also referred to as a linking device or a segment coupler, connects the data bus 13 with a fieldbus segment 15. The fieldbus segment 15 includes, such as already mentioned, a number of field devices 1-1''', which are connected with one another via a fieldbus 2. The field devices 1-1''' can be both sensors as well as also actuators. Fieldbus 11 works according to one of the known fieldbus standards, Foundation Fieldbus or HART. Temporarily connectable to the fieldbus 11 is a service unit 14, which serves for servicing one of the field devices 1-1'''.

For this, it is provided that the service unit 14 communicates via the fieldbus 11 with one or a plurality of specifically selected field devices 1-1'''.

Along with that, FIG. 1 shows a mobile terminal 3, with the assistance of which the method of the invention is performable. Mobile terminal 3 can be, in principle, any device, which has essentially the following three attributes. The first and simultaneously most important attribute is the capability of (wireless) data communication. Reachability and locatability are the other two attributes. The performing of the method of the invention, respectively the three variants of the method of the invention, is, in such case, not limited to a particular mobile terminal 3. Thus, the method of the invention can be performed with any of a large number of mobile terminals 3, such as, for example, a smart phone, a mobile telephone, a laptop (with UMTS), a tablet PC, PDA, netbook, UMPC, etc.

The method of the invention provides three variants for finding, respectively locating, a field device 1 in such a network of automation technology, respectively in an automated plant:

i. The first variant provides that a mobile terminal 3 is applied for locating at least one field device 1 in an automated plant. The automated plant is composed, in such case, of a plurality of distributed field devices 1-1''', which can be interconnected via a network 2 having at least one superordinated unit 9. For performing the method of the invention corresponding to the first variant, it is, however, insignificant, whether the automated plant has a superordinated unit 9 or not. Moreover, shown in FIG. 1 is a web server 5, in which for each of the field devices 1-1''' locational information 4 corresponding to the location of installation of the corresponding field device 1 is stored. Locational information 4 includes, in such case, at least one longitude and at least one latitude and is typically recorded, respectively ascertained, during start-up of the field device 1-1''' at the field device user's plant with the assistance of a mobile terminal 3 and/or a service unit 14 equipped with a GPS system. Alternatively for this, the locational information 4 can also be recorded, respectively ascertained, after start-up, for example, upon a service visit to the field device 1-1''' on-site. This offers then also the opportunity to ascertain locational information 4 concerning the location of installation of a field device 1-1''', which is already integrated in an automated plant, in order, in this way, to make field devices 1-1''' subsequently locatable. Besides the locational information 4 of the corresponding field device 1, also a unique identification feature 6 of the corresponding field device 1 is stored in the web server 5 and linked with the locational information 4, so that, at a later point in time, the locational information 4, which shows the location of installation of the field device 1-1''', can be downloaded based on the identification feature 6. A unique identification feature 6 for each field device 1-1''' can be, for example, the serial number and/or a tag of the field device 1. The identification feature 6 can, same as the locational information 4, be ascertained during start-up and/or upon a service visit on-site at the field device 1-1''' and then be stored in the web server 5 for the corresponding field device 1. Thus, both the locational information 4, which corresponds to the location of installation of the field device 1, as well as also the unique identification feature 6 corresponding to the field device 1 are stored in the web server 5. If, now, an operator 16, for example, a service technician, would like, at a later point in time, to locate such a field device 1 in an automated plant, the following steps are executed:

transmitting the identification feature 6 of the field device 1 to be located to the web server 5 with the assistance of the mobile terminal 3, wherein, as mobile terminal 3, also the service unit 14 can be applied, when it is equipped for communication with the web server 5, ascertaining the linked locational information 4 stored in the web server 5 based on the identification feature 6, returning the ascertained locational information 4 or a geographical map, in which the locational information 4 is entered, to the mobile terminal 3, and locating the field device 1 by means of the mobile terminal 3 based on the ascertained locational information 4, for which, for example, the mobile terminal 3 can be used as a navigation device and, based on the locational information 4, navigate an operator to the location of installation of the field device 1.

ii. The second variant provides that, for locating at least one field device 1 in an automated plant, the locational information 4 is stored in the field device 1. The automated plant is composed, in such case, of a plurality of distributed field devices 1-1''', which can be interconnected via a network 2 having at least one superordinated unit 9. In such case, the locational information 4 corresponding to the location of installation is ascertained at start-up and/or upon a service visit to the location of installation of the field device 1 on-site at the field device user's plant. This ascertained locational information 4 is then stored in the field device 1. The locational information 4 is stored, in addition to the needed parameters already present for parametering of the field device 1, as a further one or more parameters in the field device 1. The locational information 4 can, however, also be stored in the ENP (electronic name plate) of the field device. If, now, an operator 16, for example, a service technician, would like, at a later point in time, to locate such a field device 1 in an automated plant, the following steps are executed:

accessing via the network 2 with the assistance of the superordinated unit 9 the field device 1 to be located, reading-out the locational information 4 stored in the field device 1, transmitting the stored locational information 4 to the superordinated unit 9, transmitting the locational information 4 from the superordinated unit 9 to the mobile terminal 3 serving as navigation device. This can be performed, for example, by the operator, especially a service technician, for example, by typing, dictating, etc. And, locating the field device 1 to be located by means of the mobile terminal 3 based on the locational information 4 originating from the field device 1 and corresponding to the location of installation of the field device 1. In such case, also, the mobile terminal 3 serves, exactly such as in the first variant, as a navigation device and navigates an operator 16 to the location of installation of the field device 1.

iii. The third variant provides that, for locating at least one field device 1 in an automated plant, the current locational information 10 of the mobile terminal 3 is transmitted to the web server 5 and/or the superordinated unit 9 and the web server 5 and/or the superordinated unit 9 returns the locational information 4 of the field devices, which are located in a previously defined separation, respectively vicinity, from the current locational information 10 of the mobile terminal 3. The automated plant is composed, in such case, of a plurality of distributed field devices 1-1''', which can be interconnected via a network 2 having at least one superordinated unit 9. To this end, exactly such as in the case of the first variant, the locational information 4 of the field devices 1-1''' at the locations of installation of the corresponding field devices 1 is ascertained, respectively recorded, and then stored in the web server 5 and/or the superordinated unit 9. The locational information 4, 10, thus the locational information 4 of the field devices 1-1''', as well as also the current locational information 10 of the mobile terminal 3 includes, in such case, in turn, at least one longitude and at least one latitude and is typically recorded, respectively ascertained, during the start-up of the field device 1-1''' at the field device user's plant with the assistance of a mobile terminal 3 and then stored in the web server 5 and/or the superordinated unit 9. Serving as mobile terminal 3 can be, in this case, again, also a service unit 14, which is equipped with a GPS system. If, now, an operator 16, for example, a service technician, would like, at a later point in time, to locate such a field device 1 in an automated plant, the following steps are executed:

transmitting the current locational information 10 of the mobile terminal 3 to the web server 5 and/or the superordinated unit 9 with the assistance of the mobile terminal 3. In such case, the mobile terminal 3 is applied to capture the current locational information 10 of the mobile terminal 3 and, thus, to locate the current location of an operator 16. This locational information 10 is, such as already described, transmitted to the web server 5 and/or the superordinated unit 9.

ascertaining the locational information 4 stored in the web server 5 and/or the superordinated unit 9 for field devices 1-1''' located within a predetermined separation, respectively vicinity, of the transmitted current locational information 10 of the mobile terminal 3 and, thus, of the location of the operator 16. In such case, the operator 16 can, on its own, select, for example, the separation, respectively vicinity, from the current locational information 10, respectively the location, that should be searched for possible field devices 1-1''', respectively for locational information 4 for the corresponding field devices 1-1'''.

returning to the mobile terminal 3 the ascertained locational information 4 of the field devices 1 located within the separation, respectively vicinity, or a geographical map, in which the locational information 4 of the field devices 1-1''' located in the vicinity are entered, in order to visualize the location of installation of the corresponding field devices 1-1'''. In such case, all locational information 4 located in the vicinity, as such is stored in the web server 5 and/or the superordinated unit 9, are returned to the mobile terminal 3. And, locating the field devices 1 located in the predetermined separation, respectively vicinity, by means of the mobile terminal 3 based on the ascertained locational information 4.

The invention claimed is:

1. A method for locating at least one field device in an automated plant, wherein the field device is connected to at least one superordinated unit via a network composed of a plurality of distributed field devices, wherein for the distributed field devices locational information corresponding to the locations of installation of the respective field devices is stored in a web server and/or the superordinated unit, wherein a mobile terminal is applied for locating at least one field device the method for locating the field devices comprises the steps of:

transmitting the current locational information of the mobile terminal to the web server and/or the superordinated unit with the assistance of the mobile terminal, wherein the mobile terminal is applied to capture the current locational information of the mobile terminal;

ascertaining the locational information stored in the web server and/or the superordinated unit and located within a predetermined vicinity of the current locational information of the mobile terminal;

returning to the mobile terminal the ascertained locational information of the field devices located within the vicinity or a geographical map, in which the locational information of the field devices located in the vicinity are entered; and locating the field devices located in the vicinity by means of the mobile terminal based on the ascertained, returned locational information, wherein all of the locational information include at least one latitude and one longitude each.

2. The method as claimed in claim 1, wherein:

the locational information corresponding to the location of installation of the field device is ascertained at start-up of the field device in the automated plant and/or upon a service visit to the field device.

3. The method as claimed in claim 1, wherein:

the recorded locational information is stored in the field device in the form of one or more parameters.

* * * * *